Figure 1:
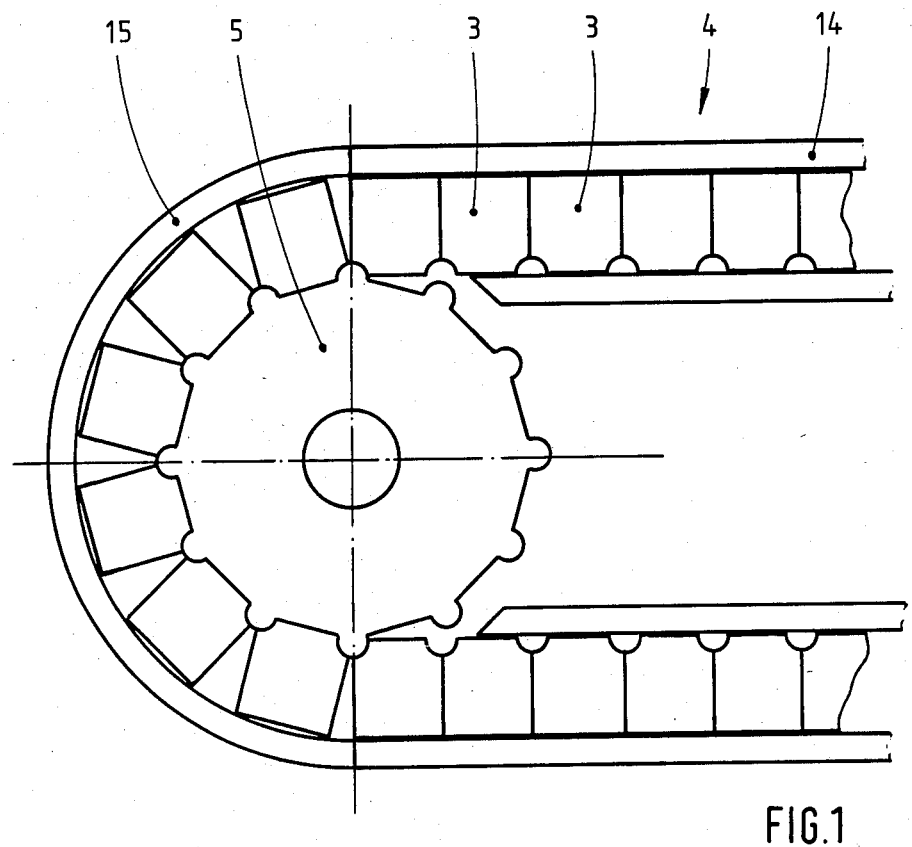

United States Patent [19]

Betz

[11] Patent Number: 4,630,995
[45] Date of Patent: Dec. 23, 1986

[54] FLUID FLOW ENGINE, ESPECIALLY POWER ENGINE ACTED UPON BY GAS

[75] Inventor: Wolfgang Betz, Gauting, Fed. Rep. of Germany

[73] Assignee: MTU Motoren- und Turbinen-Union Muenchen GmbH, Fed. Rep. of Germany

[21] Appl. No.: 643,434

[22] Filed: Aug. 23, 1984

[30] Foreign Application Priority Data

Aug. 25, 1983 [DE] Fed. Rep. of Germany ....... 3347775

[51] Int. Cl.⁴ .......................................... F01D 23/00
[52] U.S. Cl. .......................................... 416/7; 415/5
[58] Field of Search ............................ 415/5; 416/7-8

[56] References Cited

U.S. PATENT DOCUMENTS

| | | | |
|---|---|---|---|
| 643,752 | 2/1900 | Raub | 416/7 |
| 922,652 | 5/1909 | Wilson | 415/5 |
| 1,237,868 | 8/1917 | Clarkson | 415/5 |
| 1,859,145 | 5/1932 | Kerr | 416/7 |
| 2,562,388 | 7/1951 | Petr | 415/5 |
| 2,599,435 | 6/1952 | Cumming | 416/7 X |
| 3,292,899 | 12/1966 | Egli | 415/5 X |
| 4,114,046 | 9/1978 | Yousef | 416/7 X |
| 4,303,834 | 12/1981 | Li | 415/5 X |

FOREIGN PATENT DOCUMENTS

| | | | |
|---|---|---|---|
| 370067 | 2/1923 | Fed. Rep. of Germany | 415/5 |
| 1945520 | 3/1971 | Fed. Rep. of Germany | 415/5 |
| 2201639 | 7/1973 | Fed. Rep. of Germany | 415/5 |
| 2314829 | 9/1974 | Fed. Rep. of Germany | 415/5 |
| 438285 | 5/1912 | France | 415/5 |
| 2461830 | 3/1981 | France | 415/5 |
| 101241 | 9/1923 | Switzerland | 415/5 |

Primary Examiner—Everette A. Powell, Jr.
Attorney, Agent, or Firm—Craig & Burns

[57] ABSTRACT

A fluid flow engine for converting flow energy into useful energy, which includes essentially identically constructed structural parts moving in the same direction along an endless circulatory path. The circulatory path is guided or determined by way of at least two guide rollers whereby the circulatory path and/or the structural parts are in force-transmitting engagement with the guide rollers within the deflection area of the rollers. The structural parts are constructed as compact blades in the manner of the gas turbine technology and in operation produce a rotary drive of the guide rollers during the occurrence of flow energy; for example, an electric generator may be coupled to the guide rollers.

8 Claims, 2 Drawing Figures

FLUID FLOW ENGINE, ESPECIALLY POWER ENGINE ACTED UPON BY GAS

The present invention relates to a fluid power engine for converting kinetic energy into mechanical energy.

Fluid power engines of customary type are equipped with structural members which, for purposes of absorption of the fluid or kinetic energy, move along a circular path about an axis. This entails the disadvantage that in case of very large units, very high centrifugal forces become effective which very strongly impair under certain circumstances both the static as also the dynamic rigidity, respectively, characteristics. Therebeyond, it is of disadvantage that the relative movement between the individual partial areas of the structural members and the flowing medium changes continuously, and more particularly, with the distance from the axis of rotation. The circumstance must be taken into consideration in the conception and design of the structural member, with the result that aerodynamically favorable profiles with a high degree of efficiency of energy conversion exhibit for the most part a complicated configuration.

Fluid flow engines (power engines) for converting kinetic energy of water into useful energy, such as electrical energy, are already known with blades fixedly mounted in the same sense at an endless band which is so guided between deflections (at least two wheels with parallel axes and spaced from one another) that the rotating blades which move in the forward as also in the return direction, are acted upon by the onflowing medium (German Offenlegungsschrift No. 31 39 802, German Offenlegungsschrift No. 26 48 812 and British Patent No. 403,607).

However, blades fixedly mounted at an endless band cannot be verified in such a manner. Either they require special control installations or they require a mounting expenditure which can hardly be resolved.

It is the object of the present invention to provide a fluid flow engine having a simple construction and favorable degree of efficiency for the energy conversion, in which static rigidity problems play practically no role and a good dynamic operating characteristic can be obtained, especially as regards vibration and damping.

The underlying problems are solved according to the present invention in that the structural members which absorb and transmit forces from the kinetic energy are constructed as compact blades which are displaceable loosely in a stationary circulatory guidance along the circulatory path and are thereby adapted to be brought into a force-transmitting engagement with guide rollers.

The engagement is preferably also form-locking.

Appropriately, adjacent structural members are pivotally connected with each other in the manner of chain links.

It is particularly advantageous if the structural members are constructed identically.

The circulatory path extends at least partially linearly and parallelly intermediate the guide rollers so that altogether a compact construction of a fluid flow engine results and the flow direction of the flow energy present in operation (for example, gas) is optimally utilized in that the initial flow direction of the compact blades is changed, for example, by guide baffles connected upstream thereof. The initial flow direction may also be changed in any other known manner. The circulatory guidance is advantageously separated. Small centrifugal forces and a good vibration behavior are obtained if at least a partial area of the circulatory path is not constructed continuously circularly or possesses at least two different points for the center of radii of the deflection path.

A particularly favorable energy conversion efficiency is obtained because the structural members can be used in an effective force-transmitting manner practically over the entire circulatory area.

Loose structural members are present which are displaceably guided in a stationary circulatory guidance along the circulatory path. The structural member is a compact blade (in the manner of gas turbine compact blades). Appropriately, the structural member consists of ceramic material. Eventually present guide parts, housings, etc. may also correspond to the presently available technology of the gas turbine construction. Force-transmitting parts such as drive shafts, force-transmitting deflection rollers are preferably made of metal. A fluid flow machine of simple construction can be manufactured by simple means by the teachings of the present invention. Rigidity problems in the static as also in the dynamic range are reduced. The relative movement between individual partial areas of the structural members and the through-flowing medium does not change which permits simple aerodynamically favorable blades. At the same time, high efficiencies of an energy conversion can be realized by the present invention. The deflection rollers are each in fixed connection with a central shaft which can be set into rotary motion by utilization of the flow or kinetic energy, for example, by gas, but also by wind or water. The drive shaft can be coupled directly with a connected generator system for the purpose of producing electrical energy.

Figure 2:
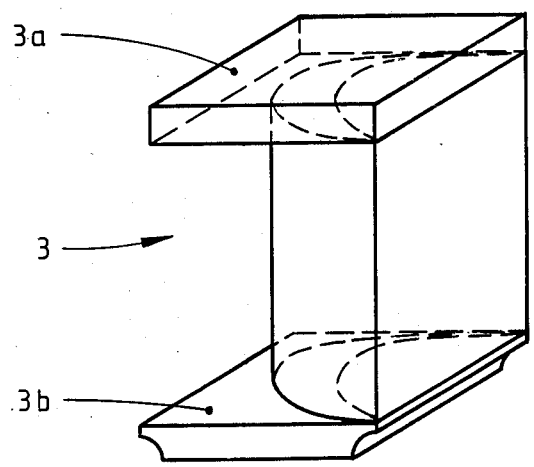

These and other objects, features and advantages of the present invention will become more apparent from the following description when taken in connection with the accompanying drawing which shows, for purposes of illustration only, one embodiment in accordance with the present invention, and wherein:

FIG. 1 is a schematic axial view of a fluid flow engine in accordance with the present invention; and FIG. 2 is a perspective view of a detail of the fluid flow engine according to FIG. 1.

Referring now to the drawing wherein like reference numerals are used throughout the two views to designate like parts, one embodiment of a fluid flow engine 1 is illustrated in these figures which consists essentially of an endless circulatory path generally designated by reference numeral 4 for the essentially identically constructed structural members generally designated by reference numeral 3.

For example, non-connected loose structural members 3 are provided for the absorption of the kinetic energy, which are guided along the circulatory path 4 in a stationary circulatory guidance 14 and 15. The circulatory guidance 14 determines thereby the path between the deflection rollers or pulleys and is constructed partially linearly. The adjoining circulatory guidance 15 includes outer circular arcs within the area of the deflecting or guide rollers so that a deflection of the structural members 3 takes place at the deflection rollers by reason of the inner guidance of the circular arc.

The parts of the stationary circular guidance can be chosen in their dimension at will as known by a person skilled in the art and can be adapted to be assembled, respectively, coordinated thereto in a conventional manner.

The structural members 3 include on the inside thereof recesses which are adapted to be brought into engagement with cams of the deflection rollers distributed along the circumference thereof in order to produce a torque at the rollers. However, also any other known force and/or form-locking engagement as known in the art may be used.

An individual structural member designated by reference numeral 3 is illustrated in greater detail in FIG. 2. It is constructed in the form of a compact blade which includes guide extensions 3a and 3b of square shape at the top and bottom. The guide extensions 3a and 3b are constructed in one piece with the compact blade, properly speaking, and consist in the illustrated embodiment of ceramic material, for example, of SiC. The drive shaft and force-transmitting guide rollers are preferably made of appropriate metallic material.

Housings, guide parts, rotor blades, guide blades, force-transmitting parts such as transmissions, control system, regulating mechanisms and other parts correspond to those found in the conventional technology of gas turbine construction including the generator for the generation of electric current and the further conduction and/or storage thereof by conventional means.

The fluid flow engine may be advantageously installed so as to be changeable in its position relative to the flow direction of the medium, especially so as to be pivotal about a shaft of a deflection roller by the use of conventional means. It may also include a guide device (baffle) connected upstream thereof.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modfications as are encompassed by the scope of the appended claims.

I claim:

1. A fluid flow engine for converting flow energy into useful energy, comprising a plurality of force transmitting means absorbing energy from said fluid flow and which are devoid of any common driving element and arranged to be displaceable along an endless closed path in guide means having straight and circular parts for straight and reversing drive direction, respectively, said path being perpendicular to the main direction of fluid flow, shaft means responsive to the displacement of said force transmitting means, wherein said force transmitting means are displaceable along said path in response to the absorption of energy to cause rotation of said shaft means.

2. A fluid flow engine according to claim 1, wherein two shaft means are spaced parallel to each other and have wheel means operatively engaging the force transmitting means.

3. A fluid flow engine according to claim 1, wherein the force transmitting means are shaped like airfoils with root and shroud portions cooperating with the guide means without changing the angle of incidence of the airfoils along their path of displacement.

4. A fluid flow engine according to claim 2, wherein the force transmitting means are shaped like airfoils with root and shroud portions cooperating with the guide means without changing the angle of incidence of the airfoils along their path of displacement.

5. A fluid flow engine for converting flow energy into useful energy, comprising a plurality of uninterlinked together force transmitting means absorbing energy from said fluid flow and arranged to be displaceable along an endless closed path in guide means having straight and circular parts for straight and reversing drive direction, respectively, said path being perpendicular to the main direction of fluid flow, shaft means responsive to the displacement of said force transmitting means, wherein said force transmitting means are displaceable along said path in response to the absorption of energy to cause rotation of said shaft means.

6. A fluid flow engine according to claim 5, wherein two shaft means are spaced parallel to each other and have wheel means operatively engaging the force transmitting means.

7. A fluid flow engine according to claim 5, wherein the force transmitting means are shaped like airfoils with root and shroud portions cooperating with the guide means without changing the angle of incidence of the airfoils along their path of displacement.

8. A fluid flow engine according to claim 7, wherein the force transmitting means are shaped like airfoils with root and shroud portions cooperating with the guide means without changing the angle of incidence of the airfoils along their path of displacement.

* * * * *